(12) United States Patent
Voegt et al.

(10) Patent No.: US 12,111,519 B2
(45) Date of Patent: Oct. 8, 2024

(54) EYEGLASS LENS, USE OF AN EYEGLASS LENS, AND PROCESS FOR MANUFACTURING AN EYEGLASS LENS

(71) Applicant: Rodenstock GmbH, Munich (DE)

(72) Inventors: Michael Voegt, Gilching (DE); Andrea Welk, Munich (DE); Hans-Peter Sommer, Munich (DE); Herbert Zinner, Rohrbach (DE)

(73) Assignee: Rodenstock GmbH, Munich (DE)

( * ) Notice: Subject to any disclaimer, the term of this patent is extended or adjusted under 35 U.S.C. 154(b) by 827 days.

(21) Appl. No.: 17/272,143

(22) PCT Filed: Aug. 27, 2019

(86) PCT No.: PCT/EP2019/072791
§ 371 (c)(1),
(2) Date: Feb. 26, 2021

(87) PCT Pub. No.: WO2020/043699
PCT Pub. Date: Mar. 5, 2020

(65) Prior Publication Data
US 2021/0325698 A1    Oct. 21, 2021

(30) Foreign Application Priority Data

Aug. 28, 2018 (DE) .................. 10 2018 006 794.8

(51) Int. Cl.
*G02C 7/10* (2006.01)
*G02C 7/06* (2006.01)
(52) U.S. Cl.
CPC ............. *G02C 7/105* (2013.01); *G02C 7/061* (2013.01); *G02C 7/102* (2013.01)

(58) Field of Classification Search
CPC ......... G02C 7/105; G02C 7/061; G02C 7/102
USPC .............................................. 351/41, 44, 45
See application file for complete search history.

(56) References Cited

U.S. PATENT DOCUMENTS

| 2011/0075093 A1* | 3/2011 | Hobbs ...................... G02C 7/16 351/45 |
| 2012/0180204 A1* | 7/2012 | Hawkins ................ A42B 3/226 351/159.64 |
| 2015/0098058 A1* | 4/2015 | De Ayguavives ....... G02B 5/26 351/159.61 |
| 2015/0231849 A1 | 8/2015 | Chapman et al. |

(Continued)

FOREIGN PATENT DOCUMENTS

| CN | 2321025 Y | 5/1999 |
| CN | 201583745 U * | 9/2010 |

(Continued)

OTHER PUBLICATIONS

Oct. 10, 2022 (CN) Office Action and Search Report—App 201980066570.1.

(Continued)

*Primary Examiner* — Stephone B Allen
*Assistant Examiner* — Leonidas Boutsikaris
(74) *Attorney, Agent, or Firm* — Banner & Witcoff Ltd.

(57) ABSTRACT

A spectacle lens for a spectacle frame having a first spectacle lens area and a second spectacle lens area. The first spectacle lens area is more strongly colored than the second spectacle lens area. The spectacle lens is phototropic at least in the second spectacle lens area.

10 Claims, 4 Drawing Sheets

(56) References Cited

U.S. PATENT DOCUMENTS

| | | | | |
|---|---|---|---|---|
| 2016/0152629 A1* | 6/2016 | Weigand | ................ | G02C 7/022 |
| | | | | 428/411.1 |
| 2018/0356650 A1* | 12/2018 | Chien | .................... | G02B 1/041 |
| 2019/0224803 A1 | 7/2019 | Masad et al. | | |
| 2020/0033639 A1* | 1/2020 | Schaffel | ................ | G02C 7/105 |

FOREIGN PATENT DOCUMENTS

| | | |
|---|---|---|
| CN | 108351446 A | 7/2018 |
| GB | 1520099 | 8/1978 |
| GB | 1520099 A | 8/1978 |
| JP | S52-128156 A | 10/1977 |
| JP | 2009-210677 A | 9/2009 |
| JP | 2013-213964 A | 10/2013 |
| JP | 2015-087439 A | 5/2015 |
| JP | 2017-058668 A | 3/2017 |
| WO | 2018/083038 | 5/2015 |
| WO | 2017/074434 | 5/2017 |
| WO | 2017074434 A1 | 5/2017 |
| WO | 2018083038 A1 | 5/2018 |
| WO | 2018/143329 A1 | 8/2018 |
| WO | 2019145782 A2 | 8/2019 |

OTHER PUBLICATIONS

Jun. 9, 2023 (JP) Office Action—App. 2021-510871.
Oct. 31, 2023 (EP) Notification in Accordance with Articel 94(3)—App. EP 19759562.2.
European Patent Office, PCT Search Report issued for PCT/EP2019/072791, 4 pgs., dated Nov. 4, 2019.

* cited by examiner

EYEGLASS LENS, USE OF AN EYEGLASS LENS, AND PROCESS FOR MANUFACTURING AN EYEGLASS LENS

TECHNICAL FIELD

The disclosure relates to a spectacle lens, the use of a spectacle lens and a method for manufacturing a spectacle lens.

The disclosure more specifically concerns spectacles for a vehicle driver, for example a vehicle driver driving a motor vehicle. When driving a car, it is helpful to use sunglasses that reduce the direct sunlight and thus reduce the driver being blinded by backlight. However, normal sunglasses have the disadvantage that, especially in backlight conditions, for example when the sun is low in the sky, it is difficult or impossible to read the instruments inside the vehicle. This concerns in particular the difficulty of reading unlit instruments.

BACKGROUND

It is possible to use, for driving, normal spectacles without coloring and/or tinting, however, in this case the direct sunlight is disturbing and can severely blind the driver.

SUMMARY

It is an object of the disclosure to provide a spectacle lens that in particular is suited to be used when driving a car.

One aspect concerns a spectacle lens for a spectacle frame comprising a first spectacle lens area and a second spectacle lens area. In this aspect, the first spectacle lens area is formed more intensely colored than the second spectacle lens area. The spectacle lens is phototropic at least in the second spectacle lens area.

The first spectacle lens area and the second spectacle lens area are different from each other and do not have any overlap. The first spectacle lens area may thus be completely different from the second spectacle lens area. The first spectacle lens area on average is more strongly colored than the second spectacle lens area is colored on average. Together, the first spectacle lens area and the second spectacle lens area may form at least 75% of the entire spectacle lens surface, preferably at least about 80% of the entire spectacle lens surface.

The spectacle lens may be formed as a spectacle lens blank or as a rimmed spectacle lens, i.e. a spectacle lens having been rimmed such that without further processing it may be inserted into a spectacle frame. This aspect may in particular comprise ready-made spectacles, i.e. a spectacle lens frame comprising two inserted rimmed spectacle glasses.

The coloring may be a tinting that reduces transmission depending on the degree of the coloring and/or tinting. For example, the first spectacle lens area may be strongly colored and have an average coloring of about 40% to about 90%, preferably of about 60% to about 80%, which corresponds to an average absorption of the visible light range in this percentage range. The second spectacle lens area may be weakly colored and/or substantially uncolored, that is have a coloring of at most 20%, preferably of at most 10%. The coloring may have a predetermined color, such as for example brown, gray, yellow, green, purple, etc.

The spectacle lens is phototropic at least in the second spectacle lens area. In particular, also the entire spectacle lens (for example including the first spectacle lens area) may be phototropic. Phototropic lenses are also referred to as self-tinting spectacle lenses. Such spectacle lenses are capable of quasi automatically adjust to light conditions. Phototropic lenses have the property of self-tinting and thus darkening with increasing light irradiation. Phototropic lenses react in particular to being irradiated with light in the ultraviolet range. Phototropic lenses are designed to automatically regulate the light irradiation of varying strength (in particular of ultraviolet light). When there is no light irradiation, in particular when there is no ultraviolet light irradiation, they may be almost transparent and/or clear and transparent without tinting. In such light conditions, the light reduction when passing through the non-tinted phototropic lens may be about 10%. The degree of tinting changes depending on the intensity of irradiating light, in particular of the ultraviolet light. In strong sunlight, for example, there may result a darkening (corresponding to an average absorption) of up to 90%.

The automatic adjustment of the phototropic glass may require a time of for example a few minutes, during which the phototropic glass adjusts to the current light conditions. The change in color or brightening is therefore not instantaneous. Phototropic spectacle lenses are well known.

The second, phototropic spectacle lens area may, for example, be formed of a phototropic glass and/or plastic and thus be phototropic "through and through" (i.e., completely solid). Alternatively, the second spectacle lens area may comprise a (for example non-phototropic) substrate having a phototropic coating. The substrate may be formed as glass and/or plastic. The substrate may be non-polarizing or polarizing. Here, a polarizing substrate with a phototropic coating may be particularly suitable as a second spectacle lens area. The polarizing effect of the second lens area may be specially adapted to the suitability of the spectacles for driving.

The first spectacle lens area having the strong coloring may be an upper spectacle lens area. The second spectacle lens area having the weaker coloring may be a lower spectacle lens area. Inside a motor vehicle, a large part of the ultraviolet light irradiation is filtered out of the spectrum of incident light by the car windows. For this reason, the phototropic spectacle lens resp. the phototropic spectacle lens area is usually not activated or at any rate only weakly activated and thus tinted inside the motor vehicle (at least in case of closed doors and windows). That means that the second spectacle lens area due to its phototropic property exhibit almost no and/or at most only a weak coloring, for example of about up to 20%, in the interior of the motor vehicle. Thus, when driving inside the vehicle, a driver can easily read the dashboards through the (for example lower) second lens area. Through the first lens area, he has stronger sun protection also inside the vehicle due to its change in color.

When the driver leaves the interior of the vehicle, any solar radiation causes a change in color of the phototropic spectacle lens areas, i.e. in particular of the second spectacle lens area. Thus, the spectacle lens may be used outside the vehicle as a normal spectacle lens with substantially completely darkened lenses, as with sunglasses.

The combination of an at least two-tone spectacle lens with the phototropic property is thus particularly suitable for use when driving a car. In principle, however, the spectacle lens may also be used for other purposes, for example when driving other vehicles with window panes that at least partially filter out ultraviolet light, such as in pilot's goggles.

According to one aspect, the first spectacle lens area has a lower transmission in the visible light range than the second spectacle lens area. The first spectacle lens area may have a transmission in the visible light range that for example corresponds approximately to the transmission of a sunglass's spectacle lens, i.e. for example an average transmission of about 10% to about 60%. The second spectacle lens area may be a substantially uncolored and/or non-tinted lens area, i.e. comprising for example an average transmission in the visible light range of at least about 80%, preferably of at least about 90%. Range of visible light refers to the wavelength range of about 400 nm to about 750 nm. When averaging over this spectral range, the first spectacle lens area exhibits a lower transmission than the second spectacle lens area. Here, the transmission in the first spectacle lens area may on average be at least 40% lower than in the second spectacle lens area, preferably about at least 50%, more preferably about at least 75%. Averaging may be performed over the wavelengths in the visible light range and/or over the die spectacle lens surface of the respective spectacle lens areas. The first spectacle lens area thus may operate substantially as a sunglass's lens, whereas the second spectacle lens area (at least inside a vehicle) is substantially transparent and clear, i.e. uncolored. Outsides, however, the second spectacle lens area may also operate as sunglasses lens, depending on solar radiation and its phototropic property. The transmission data refer to the total incidence of light on the spectacle lens, even if it has for example an anti-reflective coating.

According to one aspect, the phototropic change in color of the spectacle lens (in particular of the second spectacle lens area) is matched to the coloring of the first and/or second spectacle lens area. This may mean that the tint of the coloring of the first spectacle lens area (and possibly of the second spectacle lens area) corresponds to the phototropic activated tint that the second spectacle lens area assumes in case of light irradiation and activation. For example, a predetermined tint such as for example brown may be used for the coloring, and the phototropic change in color of the second spectacle lens area may occur in the exact same tint (in this example also a brown change in color in case of being irradiated with ultraviolet light).

The second spectacle lens area may have a change in color with the same tint, but as described correspondingly less pronounced than the first spectacle lens area. The phototropic coloration may thus be matched to the (physical) coloration of the first spectacle lens area both in terms of the tint and in terms of its intensity and/or strength. This may mean that when the phototropic second spectacle lens area is fully activated by ultraviolet light irradiation, the second spectacle lens area exhibits approximately the same color and/or approximately the same color strength and/or color intensity as the first spectacle lens area. In this case, the spectacle lens looks optically like a single-colored spectacle lens without gradient coloring, which is colored to the same extent and/or in the same shade in all areas. In this way, the overall optical impression of the spectacle lens can be improved and, in addition, irritation of the spectacle lens wearer due to different color shades or color intensities can be reduced.

According to one aspect, the first spectacle lens area exhibits an average transmission in the visible light range of at most about 20%, preferably between about 60% and about 80%, and/or the second spectacle lens area exhibits an average transmission in the visible light range of at least about 60%, preferably of at least about 85%. The average transmission is averaged over the wavelengths of the visible light range and/or over the area occupied by the respective spectacle lens area. The transmission data refer to the total light incidence on the lens, including any potential anti-reflection coating. Thus, the transmission of the spectacle lens areas differs significantly from each other.

According to one aspect, the first spectacle lens area is an upper spectacle lens area comprising at least a distance reference point and/or a distance visual point of the spectacle lens. The first spectacle lens area may comprise in particular also an approximately circular glass surface area around the distance reference point resp. the distance visual point, wherein the glass surface area may have a diameter of at least 4 mm, preferably of at least 6 mm, more preferably of at least 8 mm. In other words, the first spectacle lens area may begin already a few millimeters below the distance reference point and/or the distance visual point.

Distance reference point here refers to the distance reference point of a progressive lens or of a progressive spectacle lens. The distance visual point here refers to the distance visual point of a single vision lens resp. of a non-optical spectacle lens. This means that the wearer of glasses with this lens is protected from the sun's rays by the more intensely colored first lens area when looking into the distance, i.e. especially under the normal line of vision when driving a car.

In general, the distance reference point may be defined as the primary reference point according to DIN EN ISO 21987 of 2017 and/or as the far design reference point according to DIN EN ISO 13666 of 2013 and/or as the far reference point main reference point according to DIN EN ISO 13666 of 2013. The distance visual point may be defined as the far visual point according to DIN EN ISO 13666 of 2013. This may coincide with the distance reference point.

In a further aspect, the first, upper spectacle lens area comprises the entire area of the spectacle lens that in wearing position is above the distance reference point and/or the distance visual point. In other words, the entire upper spectacle lens area from the upper spectacle lens edge up to at least the distance reference point and/or distance visual point is provided with the stronger coloring, i.e. is formed as the first spectacle lens area. Thus, the spectacle wearer is protected from light irradiation from the front and above.

According to one aspect, the second spectacle lens area is a lower spectacle lens area comprising at least a near reference point and/or a near visual point of the spectacle lens. Here, the second spectacle lens area may in particular comprise also an area around the near reference point and/or the near visual point, for example an approximately circular glass surface area having a diameter of at least 4 mm, preferably of at least 6 mm, more preferably of at least 8 mm. Here, the second, lower spectacle lens area starts already above the near reference point and/or the near visual point.

Here, the near reference point is the near reference point of a progressive lens or of a progressive spectacle lens. The near visual point is a point on a spectacle lens of uniform power which substantially corresponds to the near reference point of a progressive spectacle lens. In this aspect, reading is thus performed through the second spectacle lens area, that is, through the less colored resp. uncolored spectacle lens area. This simplifies the reading of instruments inside the vehicle, especially with backlighting.

In general, the near reference point may be defined as the secondary reference point according to DIN EN ISO 21987 of 2017 and/or as the near design reference point according to DIN EN ISO 13666 of 2013. The near visual point may be defined as the near visual point according to DIN EN ISO 13666 of 2013. It may coincide with the near reference point.

In a further aspect, the second, lower spectacle lens area comprises the entire area of the spectacle lens that in wearing position is arranged below the near reference point and/or the near visual point. In other words, the second spectacle lens area comprises the entire lower spectacle lens area from the lower spectacle lens edge up to at least the near reference point and/or near visual point, preferably also a few millimeters beyond this, for example between about 2 mm to about 10 mm beyond this, preferably of about 3 mm to about 6 mm beyond this.

According to one aspect, between the first spectacle lens area and the second spectacle lens area, there is formed a transition area along which the coloring of the spectacle lens is decreasing from the first spectacle lens area to the second spectacle lens area. The first spectacle lens area, the second spectacle lens area and the transition area together may form the entire area of the spectacle lens. The three lens areas may exhibit no overlap, i.e. may be formed a really separated from each other. The transition area may extend from one temporal spectacle lens edge approximately horizontally across the entire spectacle lens to a nasal spectacle lens edge. The transition area may divide the spectacle lens into the first spectacle lens area and the spectacle lens area. Here, the first spectacle lens area and the second spectacle lens area do not have any direct border with each other, but are arranged at a distance to each other separated by the transition area. In the first spectacle lens area and/or in the second spectacle lens area, the change in color may be realized substantially constant. The change in color may change in strength only along the transition area. The tint of the change in color may be realized as being the same in all three areas, for example brown. The transition area provides a smooth color transition between the first and second spectacle lens area and prevents a sudden, irritating color transition between these two areas.

In a further aspect, the change in color changes along the transition area approximately continuously from the color grade of the first spectacle lens area to the color grade of the second spectacle lens area. In this case, the change in color in for example vertical direction may thus decrease or increase quasi continuously between the two lens areas. The change may increase or decrease along an essentially vertical direction in the wearing position.

In a further aspect the coloring and/or the degree of absorption changes along the transition area for example according to the formula:

$$f(y') = a1 + \frac{a2 - a1}{(1 + e^{c(y'-d)})}$$

Here, a1 corresponds to a maximum degree of absorption, a2 corresponds to a minimum degree of absorption, c corresponds to a factor for controlling the function curve, d corresponds to the position of the reversal point and y' corresponds to either the vertical spectacle lens coordinate y, or to a spectacle lens coordinate y' totatet about an angle β with regard to the vertical spectacle lens coordinate y. The degree of absorption may change proportionally to the strength of coloring.

Depending on the value of the factor c, the degree of absorption (and thus the degree of transmission) changes more or less rapidly. a1 for example corresponds to the coloring of the first spectacle lens area, i.e. for example its absorption. a2 for example corresponds to the coloring of the second spectacle lens area, i.e. for example its absorption. d determines the height of the reversal point of the function, thus approximately corresponds to the vertical middle of the transition area. By means of the position of the reversal point, it is thus possible to define the vertical height of the color gradient. y' may correspond to the vertical spectacle lens coordinate y and may be defined depending on a middle point of the spectacle lens. Here, the spectacle lens component y' may also be arranged at an angle to the actual vertical line, so that it also comprises a horizontal component.

In the aspect in which y' corresponds to the vertical spectacle lens coordinate y, there results a color gradient along the spectacle lens that changes only in vertical direction. In horizontal direction, i.e. in nasal and/or temporal direction, the coloring and thus the absorption of the spectacle lens is constant. Here, the above formula may apply for the entire horizontal width of the spectacle lens. In this case, the strength of the coloring and thus the absorption changes only in vertical direction along the spectacle lens, but not in the horizontal direction.

Alternatively, the above formula may apply only in a horizontal middle spectacle lens area, i.e. for example from x=−5 mm to x=+5 mm, wherein x corresponds to the horizontal coordinate of the spectacle lens. At the nasal and/or temporal border of the spectacle lens, the color gradient may be shifted somewhat higher or lower by a different value for the reversal point d and/or a different control factor c.

In a further aspect the coloring of the spectacle lens in the transition area changes along a vertical distance of about 5 mm to about 20 mm, preferably between about 5 mm and about 10 mm. This distance substantially indicates the vertical height of the transition area along which the change in color changes. This relatively narrow and/or low design of the transition area causes a good separation between the first spectacle lens area and the second spectacle lens area with the functionalities provided by this spectacle lens area.

According to one aspect the transition area is arranged in a spectacle lens area that starts at an angle of rotation of at least about 5° below the straight ahead gaze direction and ends at an angle of rotation of at most about 25° below the straight ahead gaze direction. In this way, it is ensured that the straight ahead gaze direction itself is arranged in the first spectacle lens area and that the lower spectacle lens area, in particular below of at least 25°, is arranged in the second spectacle lens area. The straight ahead gaze direction results from the relevant standards.

In a further aspect the spectacle lens comprises an refractive power curve having an addition. Here, the transition area is arranged in a spectacle lens area of about 10% of the addition to about 50% of the addition in the refractive power curve. In case of spectacle lenses having an addition to the refractive power curve, i.e. for example progressive spectacle lenses, the color gradient along the transition area may be adjusted to the refractive power curve.

The second (lightly tinted or non-tinted) spectacle lens area may comprise a calculated object distance along the refractive power curve of about 80 cm. Most instruments inside the vehicle should be arranged inside this distance, so that these may easily be read through the second spectacle lens area.

In a further aspect the spectacle lens comprises a distance reference point and/or a distance visual point. An upper edge of the transition area is arranged between about 5 mm and about 20 mm below the distance reference point and/or the distance visual point. Here, the location of the color gradient may be defined by the distance of the start of the color gradient to the distance reference point and/or to the distance visual point of a progressive spectacle lens resp. single vision lens. The upper edge of the transition area should be arranged between about 5 mm and about 20 mm below the distance reference point and/or the distance visual point, preferably between about 5 mm and about 10 mm below the distance reference point and/or the distance visual point. This results in a particularly safe and protected vision through the first spectacle lens area while driving.

According to one aspect, the coloring of the spectacle lens areas is realized as a brown coloring. Here, in particular the first spectacle lens area and possibly the transition area and/or the second spectacle lens area may have a brown coloring. In addition, also the phototropic property of the at least second spectacle lens area may cause a brown change in color of the spectacle lens, wherein the two brown tints may approximately correspond to each other. The brown coloring generally comprises a substantially higher red component than other colorings, for example green or grey colorings. This means that the die transmission in the red wavelength range is higher with brown colorings than with other colorings. This enables better vision at dusk, since the proportion of long-wave (red) light increases at dusk. The sun is particularly low at twilight and can hinder the reading of instruments. Furthermore, brown change in color enables increased visibility of red light sources such as for example taillights and/or brake lights at dusk and/or in bad weather. Thus, brown coloring can result in improved road safety compared to other colors.

According to one aspect, the first lens area and/or the second lens area is formed to be approximately equally tinted over approximately the entire lens area over which the respective lens area is formed. In other words, the first lens area is formed with substantially the same amount of tint, while the second lens area is formed with substantially no tint (or constant light tint) over substantially its entire area. Neither of the two lens areas exhibits a color gradient. Such a color gradient may be formed, if at all, only in the transition area mentioned above. The essentially monochromatic design of the two lens areas reduces irritation of the lens wearer by any color gradients.

According to one aspect, the spectacle lens comprises an antireflective coating which in the wavelength range between 450 nm and 550 nm exhibits a residual reflection of less than 4% per spectacle lens side of the incident light, preferably less than 2% per spectacle lens side of incident light, more preferably of less than 1% per spectacle lens side of incident light. Such a high quality antireflective coating is particularly well suited for spectacle lenses for driving a vehicle, as this reduces disturbing light reflections particularly well.

One aspect relates to the use of a spectacle lens according to the preceding aspect in a spectacle frame for driving a car. As described above, the spectacle lens is suitable in particular for driving a car, since the first spectacle lens area can substantially act and/or be formed as a sunglass lens, while the second spectacle lens area facilitates reading of instruments and/or other details in the vehicle interior, in particular in backlight conditions.

One aspect relates to a method of manufacturing a spectacle lens for a spectacle frame, wherein a first spectacle lens area is more strongly colored than a second spectacle lens area, and wherein the second spectacle lens area is provided and/or formed as a phototropic spectacle lens area.

The method may be used in particular for manufacturing a spectacle lens according to the above aspect. Therefore, all explanations regarding the spectacle lens also refer to the method and vice versa.

In the context of the present disclosure, the terms "substantially" and/or "about" resp. "approximately" may be used to include a deviation of up to 5% from a numerical value following the term, a deviation of up to 5° from a direction following the term and/or from an angle following the term.

Terms such as upper, lower, above, below, etc., unless otherwise specified, refer to the reference frame of the earth in the position of use of the spectacle lens. The wearing position is defined in the relevant related standards.

BRIEF DESCRIPTION OF THE DRAWINGS

The disclosure is described in more detail below on the basis of aspects shown in figures. Here, identical or similar reference signs may indicate identical or similar features of the aspects. Individual features shown in the figures may be implemented in other aspects.

DETAILED DESCRIPTION

Figure 1:
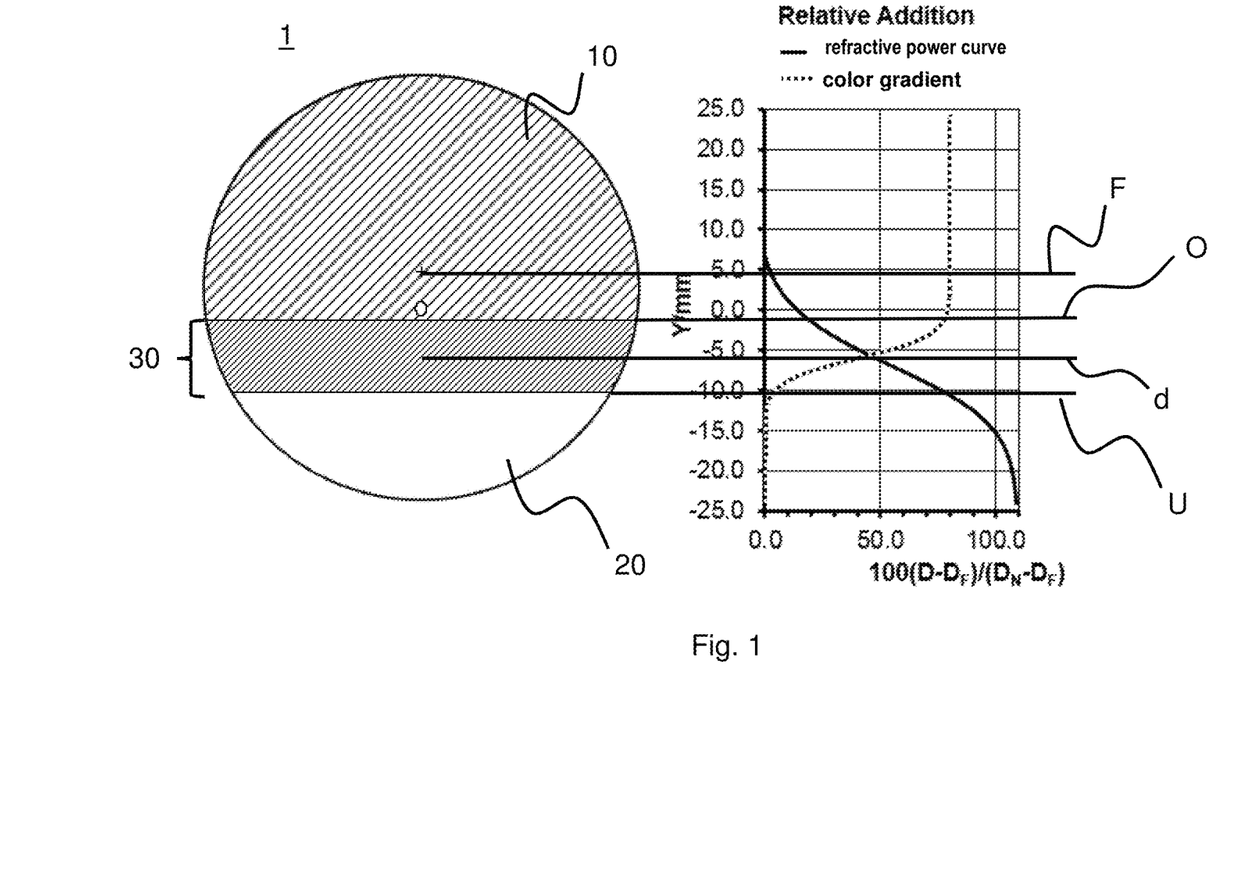
FIG. 1 shows a schematic representation of a spectacle lens having a refractive power curve and a color gradient, together with an associated diagram.

FIG. 1 shows a schematic representation of a spectacle lens 1 which has a color gradient on its lens surface. The spectacle lens 1 is schematically shown as a tubular spectacle lens in the left half of FIG. 1.

The geometric center of the tubular spectacle lens is marked by a circle, which may be formed as a permanent marking on the spectacle lens. The spectacle lens 1 is divided into a total of three spectacle lens areas. A first, upper spectacle lens area 10 (marked with hatching) extends from a vertically upper boundary of the spectacle lens, i.e. an upper spectacle lens edge, to an upper edge O of a transition area 30. The transition area 30 is marked with narrow hatching and represents a further (for example third) spectacle lens area. From the vertically lower end of the spectacle lens 1, i.e. a lower spectacle lens edge, a second, lower spectacle lens area 20 extends to a lower edge U of the transition area 30.

In the aspect shown, the first spectacle lens area 10 includes both a far point F, which is marked by a cross, and a geometric center of the spectacle lens 1.

Definitions for the far point and/or the geometric center may be taken from the relevant standards. Furthermore, the location of these points to some extent may depend on the manufacturer.

In the aspect example shown, the first spectacle lens area 10 comprises more than the (upper) half of the tubular spectacle lens 1. The entire first spectacle lens area 10 is configured colored, namely colored over the entire area approximately equally strongly with an approximately constant tint. This results in approximately constant absorption (over the area of the first spectacle lens area) of light incident through the first spectacle lens area 10.

The second spectacle lens area 20 is formed substantially uncolored. In this regard, the strength (i.e., degree) and tint of the coloring is substantially constant throughout the second lens area. The tinting contributes little or almost nothing to the absorption in the second lens area 20.

In the transition area 30, the coloration of the spectacle lens 1 changes. Here, the transition area 30 has essentially the same (strong) coloration at its upper edge O as the first spectacle lens area 10. At its lower edge U, the transition area 30 has essentially the same weak coloration as the second spectacle lens area 20. In the shown aspect example, there is essentially no more coloration at the lower edge U, the lower edge U is thus formed essentially transparent and uncolored, just like the second spectacle lens area 20.

Along the transition area 30, the coloration changes substantially continuously from the top edge O to the bottom edge U. From top to bottom, the coloration of the spectacle lens decreases substantially continuously along the transition area 30.

The exact course of the coloration is shown in a diagram in the right part of FIG. 1. Here, the color progression is indicated by a dotted line. As shown in this diagram on the right, the entire first, upper spectacle lens area 10 is colored substantially to the same extent. In the aspect example, it has a coloration and/or absorption of about 80%.

In the diagram, the y-coordinate is shown in millimeters from −25 mm to +25 mm along the tubular spectacle lens 1. The first spectacle lens area 10 extends from the upper edge of the spectacle lens, for example from about y=+25 mm to just below the geometric center, for example to just below the zero point, for example to about y=−1 mm.

The second lens area 20 extends from the lower lens edge, for example, from approximately y=25 mm, to the lower edge U of the transition area 30, which is located at approximately y=−11 mm. Thus, the transition area 30 extends from approximately y=−1 mm to approximately y=−11 mm on the tubular lens 1. Along this vertical distance of approximately 10 mm, the absorption and top-to-bottom color gradient reduces from approximately 80% to approximately 0%. A reversal point of the function curve is drawn as a line and marked with a d. The reversal point d marks approximately the vertical center of the transition area 30. In the shown aspect, the reversal point d is shown approximately at the y coordinate of −6.0 mm.

The distance reference point F is located approximately at y=+4.0 mm and is thus fully located in the first spectacle lens area 10.

The spectacle lens 1 may be designed as a progressive spectacle lens and have a refractive power curve with an addition. The curve of the addition is also shown in the diagram in the right half of FIG. 1. The refractive power curve is indicated by a solid line. An approximate mathematical formula for the refractive power curve is shown below the diagram in the right half of FIG. 1.

Along the transition area, the coloration may be approximately described by the following equation:

$$f(y') = a1 + \frac{a2 - a1}{(1 + e^{c(y'-d)})}$$

This is a function of the vertical coordinate y of the spectacle lens 1, where a1 corresponds to the maximum absorption coefficient, in the aspect example about 80%. a2 corresponds to the minimum absorption coefficient, in the aspect example about 0%. The variable c represents a factor for controlling the course of the function, which is preferably from about 0.1 to about 1.0, preferably from about 0.4 to about 0.9, most preferably at about 0.7. The variable d indicates the reversal point and is located approximately at y=−6 in the aspect example shown in FIG. 1. The definition of the reversal point determines the vertical center and/or position of the transition area 30.

The spectacle lens 1 is also phototropic. Here, in particular, the second spectacle lens area 20 and also the transition area 30 are phototropic. Preferably, the complete spectacle lens 1 is made of a phototropic material, since this is the easiest to manufacture.

The phototropic property causes the material of the spectacle lens 1 to change color when light of a specific wavelength is irradiated, in particular when light of ultraviolet light is irradiated. In the first spectacle lens area 10, this can have hardly any effect on the optical appearance and/or the overall absorption, since the first spectacle lens area 10 is already formed colored anyway. In individual cases, however, the coloring of the first spectacle lens area 10 may additionally be darkened and/or changed in color somewhat due to the activation of the phototropic property.

In the transition area 30 and in particular in the second spectacle lens area 20, the phototropic property of the spectacle lens 1 is more noticeable. Here, the spectacle lens changes color in such a way that both the transition area 30 and the second spectacle lens area 20 are approximately as strongly colorized as the first spectacle lens area 10. Optically, hardly any difference can be seen between the different spectacle lens areas 10, 20 and 30.

Under ultraviolet irradiation, the second spectacle lens area 20 and the transition area 30 also exhibit an absorption which corresponds approximately to the absorption in the first spectacle lens area 10. Here, slight deviations of at most about 10% of the absorption may occur, preferably at most 5% of the absorption value over the entire lens area.

As described at the beginning, the spectacle lens 1 is particularly suitable for use in a vehicle. Inside a car, the driver usually looks at the road approximately through the far point F, i.e. through the upper, first spectacle lens area 10. In this case, the driver is protected from excessively strong incident light by the absorption effect of the colored first spectacle lens area 10.

The driver's view of the upper edge of his dashboard may be approximately through the upper edge O of the transition area 30. The position of the transition area 30 may here be adapted to the driver's viewing direction. In particular, the lower edge U of the transition area 30 may still be located above the near reference point. The driver can thus read the instruments at least partially through the second spectacle lens area 20. Furthermore, the driver may also be able to read the instruments partially through the transition area 30. Thus, the view of the displays and/or the dashboard area inside the vehicle is hardly or only slightly restricted and/or obstructed by the coloring of the spectacle lens 1.

The spectacle lens 1 provides both a functional gradient coloring inside the vehicle and an aesthetic sun protection lens outside.

The gradient coloration along the spectacle lens 1 may be matched to the viewing angle of the spectacle wearer through the spectacle lens, particularly for single vision lenses and/or progressive lenses. In progressive spectacle lenses, the gradient coloration may also be matched to the refractive power curve and/or the object distance.

The gradient coloration may be matched to the object distance in such a way that the coloration changes during the change of gaze from the view into the distance (corresponding to an object distance of infinity) to the near (corresponding to an object distance of about 40 cm) in such a way that the transition of the color gradient occurs at the object distances between about 350 cm and about 50 cm. Here, the upper edge O of the transition area 30 may be set to an object distance of about 280 cm, in particular in a range of about 350 cm to 200 cm. The lower edge U of the transition area 30 may be set to an object distance of about 80 cm, preferably in a range of about 120 cm to about 50 cm.

Alternatively or additionally, the coloring gradient may be adjusted to the angle of rotation in such a way that the change in color changes when changing view from looking in the distance (corresponding to an angle of rotation of about 0°) to a view in the proximity (corresponding to an angle of rotation of about 30° to about) 40° in such a way that the change of the color gradient occurs between the viewing angles of about 5° to 25°. The upper edge O of the transition area 30 may be set for example to an angle of rotation of about 8° (downwards), preferably between about 5° and about 10°. The lower edge U of the transition area 30 may be set to an angle of rotation of about 20° (downwards), preferably to an angle of rotation of about 15° to about 25°.

In other words, the gradient coloration, and in particular the positioning of the transition area 30, may be adapted to the object distance and/or to the viewing angle. This may be done for progressive spectacle lenses as well as for single vision lenses.

In another aspect, the gradient coloration may be individually adapted to the viewing angle of the spectacle wearer in that the transition of the gradient is individually adapted to the conditions of use of the spectacle wearer. For example, the distance and/or the viewing angle height of the dashboards in the car may depend on the vehicle class and/or the vehicle type. The dashboard heights may strongly depend on the vehicle type. For example, the dashboards of a sports car may be positioned at different heights than those of an SUV.

Furthermore, the seat height of the person wearing the spectacles and/or the adjusted seat height position may also lead to a change in the relative position of the instruments to the person wearing the spectacles. When adjusting the gradient coloration individually, the real conditions for a spectacle wearer can be measured individually, and then the position of the transition area can be adjusted to the individual distances. For example, the upper edge O of the transition area may be set approximately at the level of the upper edge of the dashboard. This ensures that all light directly incident through the windshield is incident on the eyes of the spectacle wearer through the first spectacle lens area 10.

The vertical height of the transition area 30, i.e. the exact value of the variable c, may also be selected depending on how high or low below the upper edge of the dashboard the first displays should be visible to the wearer of the spectacles.

The preceding configurations of the gradient coloration are suitable for single vision lenses as well as for progressive spectacle lenses. Two further aspects are described below, which may be used specifically for progressive spectacle lenses.

The gradient coloration may be designed completely as a function of the refractive power gradient along the spectacle lens. In this regard, the coloration in the spectacle lens may decrease continuously from top to bottom coupled to the increase in refractive power due to an addition. For example, the top edge O of the transition area 30 may be placed at a first y-value, for example at y=+4 mm, and the bottom edge U of the transition area 30 may be placed at a second y-value, for example at y=−14 mm.

The gradient coloration may further be designed as a function of the refractive power curve in the spectacle lens. In this regard, a decrease in coloration in the spectacle lens from top to bottom may be coupled to an increase in refractive power due to an addition. For example, the transition area 30 may be positioned in a range between reached position of 10% and 50% of the addition in the refractive power curve. At these percentage values of the addition, for example the above-mentioned viewing angles can result.

The above equation may be used to generate a color gradient that is as continuous and steady as possible. This results in a vertical height of the transition area 30 between an (upper) predetermined initial absorption a1 and a (lower) predetermined final absorption a2. The position of the gradient and thus of the transition area 30 may be defined by the distance of the beginning of the color gradient, i.e. the upper edge O of the transition area 30, to the distance reference point F of a progressive lens and/or the distance viewing point of a single vision lens. In this case, the upper edge O of the transition area 30 is preferably arranged from 5 mm 20 mm below the distance reference point F, preferably between 5 mm and 10 mm below the distance reference point and/or the distance viewing point.

In the aspect shown, the color strength and/or tint are constant in the horizontal direction, i.e. nasal and temporal, of the coloration. Thus, the coloration does not change along the spectacle lens in the horizontal direction, regardless of the respective height y on the spectacle lens 1. Such a gradient coloration is particularly easy to produce and thus preferred.

The horizontally constant gradient coloration of a spectacle lens 1 may be achieved by immersing the spectacle lens 1 to a certain depth in a color solution. During manufacture, for example, the second spectacle lens area 20 may not be immersed in the color solution at all. The transition area 30 may be immersed in the color solution for different lengths of time, depths, and/or frequencies in different areas. The first spectacle lens area 10 can be immersed in the color solution the longest and/or relatively often. This results in a change in coloration of the spectacle lens 1 that is adjusted in a straight line in the horizontal direction.

In an alternative aspect, the color gradient does not necessarily have to be horizontally constant and linear as described above. The color gradient may for example be adapted to the gaze movement of the car driver, in particular to the gaze movement in the direction of the center console in the car, in the direction of a navigation screen and/or the like. The profile can be laterally shifted and/or curved in order to be adapted to conditions in the vehicle interior. Thus, in particular in the direction towards the interior of the vehicle, i.e. for example in Germany towards the right, for example in Great Britain towards the left, as seen from the spectacle wearer, the second spectacle lens area 20 and/or the transition area 30 can be arranged vertically somewhat higher than at the opposite outer horizontal spectacle lens edge of the spectacle lens 1.

Figure 2A:
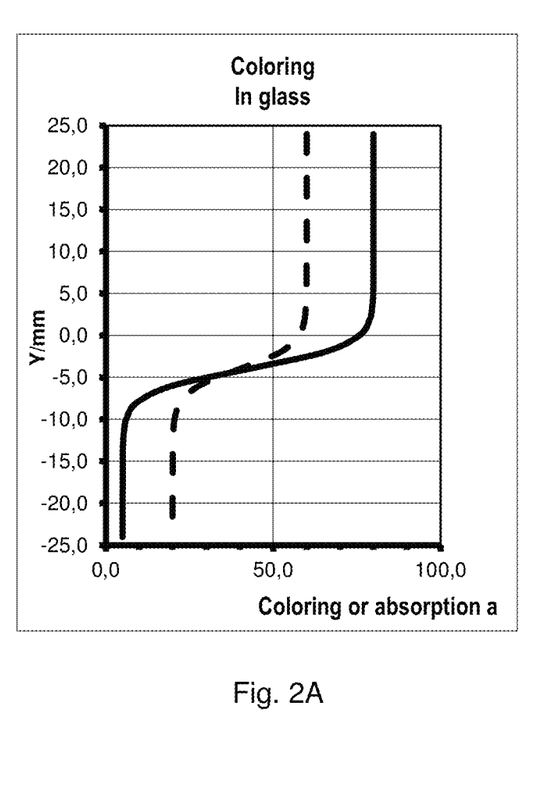
FIG. 2A shows in a diagram two aspects of a color gradient along a vertical coordinate of a spectacle lens.

FIG. 2A shows in a diagram two aspects of a gradient coloration along a vertical direction of a spectacle lens. These colorations differ from the colorations shown in FIG. 1. However, the colorations both follow the formula given by the preceding equation.

A first aspect is shown in FIG. 2A with a solid line. Here, the absorption a1=80%, the absorption a2=5%, the factor c=0.7, and the reversal point d is located at y=−4 mm. This results in the gradient coloration indicated by the solid line in FIG. 2A.

A second example is shown in FIG. 2A with the dashed line. Here, the absorption a1=60%, the absorption a2=20%, the factor c=0.7, and the reversal point d is located at y=−4 mm.

Both aspects shown in FIG. 2A result in a reasonable gradient coloration for the spectacle lens 1 in practical tests. Not shown in the figure is the additional phototropic property of the spectacle lens 1.

Figure 2B:
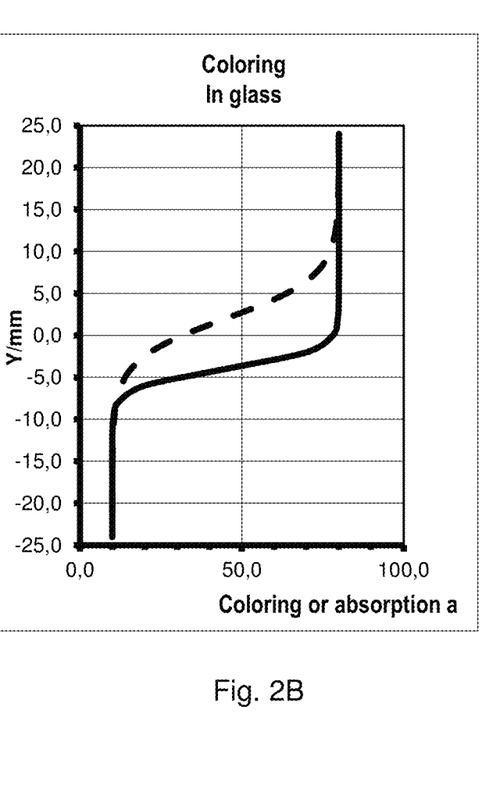
FIG. 2B shows in a diagram two further aspects of a color gradient along a vertical coordinate of a spectacle lens.

FIG. 2B shows two further such aspects in diagram form. Here, the diagram again shows the coloration of the aspects, where the coloration essentially corresponds to the absorption of the spectacle lens in the vertical direction.

An aspect example is marked with a solid line in FIG. 2B. Here, the absorption a1=80%, the absorption a2=10%, the factor c=0.9, and the reversal point d is located at y=−4 mm.

The last aspect is marked with a dashed line. Here, the absorption a1=80%, the absorption a2=10%, the factor c=0.4, and the reversal point d is located at y=+2 mm.

As shown in the last aspect example, a smaller factor c results in a smoother change of the color gradient, and thus also to a larger vertical height of the transition area 30. Thus, by adjusting the factor c, the vertical height of the transition area can be fixed and/or determined.

By using one of the above spectacle lenses, buttons and/or displays in the interior of the vehicle can be read more easily through the bright area of the spectacle lens, i.e. the second spectacle lens area 20. Outside the vehicle, the spectacle lens 1 also darkens in the lower spectacle lens area 20. This results in a sun protection lens that is substantially uniformly tinted over the entire surface.

Figure 3:
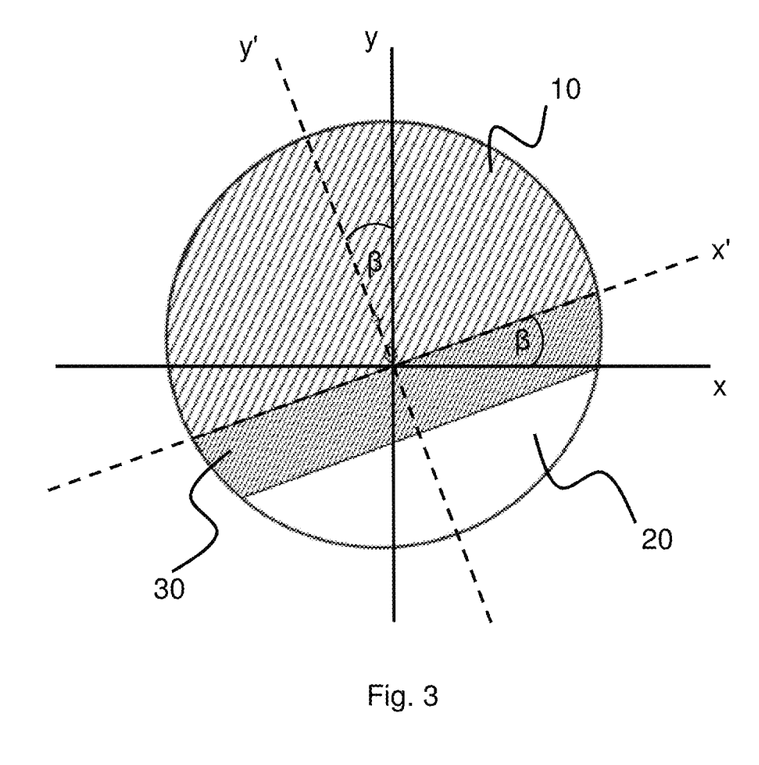
FIG. 3 shows in a schematic diagram of a spectacle lens with a color gradient arranged at an angle to the vertical.

FIG. 3 shows a schematic representation of a further spectacle lens with a color gradient which is arranged at an angle to the vertical. The spectacle lens is divided into a total of three spectacle lens areas. A first spectacle lens area 10 (marked with hatching) extends from a spectacle lens edge arranged approximately at the top to an upper edge O of a transition area 30. A second spectacle lens area 20 extends approximately from the lower end of the spectacle lens to a lower edge of the transition area 30. The transition area 30 is marked with narrow hatching and represents a third spectacle lens area.

The characteristics of the spectacle lens areas 10, 20 and 30 are substantially the same as those of the spectacle lens 1 shown in FIG. 1. In contrast, the spectacle lens areas 10, 20 and 30 including the gradient coloration of the spectacle lens shown in FIG. 3 are tilted by an angle β with respect to the vertical and are thus arranged at an angle to the vertical. However, the refractive gradient may be exactly the same as that of the spectacle lens shown in FIG. 1 (and thus is not tilted).

Just as in the spectacle lens 1 shown in FIG. 1, along the transition area 30 the coloration changes substantially continuously from the obliquely arranged upper edge O to the obliquely arranged lower edge U. From the top edge O to the oblique bottom edge U, the coloration of the spectacle lens decreases substantially continuously along the transition area 30.

Similar to the spectacle lens 1 shown in FIG. 1, the coloration along the transition area 30 can be described approximately by the following equation:

$$f(y') = a1 + \frac{a2 - a1}{(1 + e^{c(y'-d)})}$$

This is a function of the rotated coordinate y' of the spectacle lens. Here, a1 corresponds to the maximum absorption coefficient, in the aspect example about 80%. a2 corresponds to the minimum absorption coefficient, in the aspect example about 0%. The variable c represents a factor for controlling the function progression, which is preferably from about 0.1 to about 1.0. The variable d indicates the reversal point.

In contrast to the spectacle lens shown in FIG. 1, the course of the coloration of the spectacle lens shown in FIG. 3 is not aligned in an exactly vertical direction along the vertical y-coordinate, but along the angularly twisted coordinate y'. The twisted coordinate y' can be obtained by coordinate transformation from the vertical coordinate y twisted by the angle β in the plane of the lens. Here, the angle β is between 0° and 90°, preferably between 0° and 40°, particularly preferably between 0° and 20°. For such an angularly tilted color gradient relative to the vertical, tilting angles β between 10° and 20° are particularly suitable.

Here, both spectacle lenses of a spectacle may have a color gradient tilted in the same direction, so that a center console of a vehicle can be read more easily through the second spectacle lens area 20. The color gradient may thus be tilted in such a way that the vertically highest point of the second spectacle lens area 20 is located on the side of the lens facing the central longitudinal axis of the vehicle (for example to the right of the driver in Germany, to the left of the driver in the United Kingdom, etc.).

Figure 4:
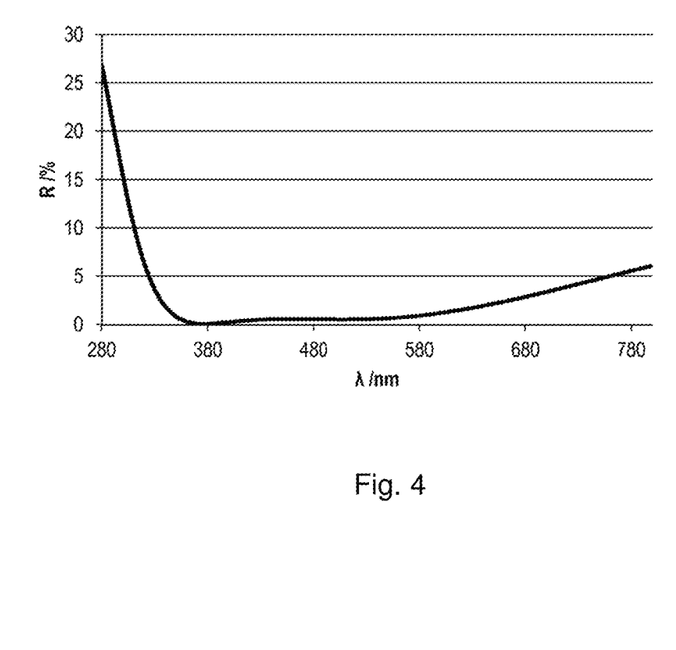
FIG. 4 shows in a diagram of the reflection profile of an anti-reflective layer of the spectacle lens.

FIG. 4 shows in a diagram the reflection of an antireflection coating which can be applied to the spectacle lens.

In principle, the spectacle lens may be provided with any anti-reflective coating. However, for the spectacle lens with the described gradient coloration, a high-quality antireflection coating is particularly suitable, i.e. an antireflection coating with the smallest possible residual reflection. Such an antireflection coating is particularly suitable for driving, in order to avoid disturbing light reflections, especially when driving.

The residual reflection curve of such a high-quality anti-reflection coating is shown for example in FIG. 4. This antireflection coating has in particular in the wavelength range between 450 nm and 550 nm a very low residual reflection of less than 4% per spectacle lens side of the incident light, preferably of less than 2% per spectacle lens side of the incident light, especially preferably of less than 1% per spectacle lens side of the incident light.

LIST OF REFERENCE SIGNS 1 spectacle lens
10 first spectacle lens area
20 second spectacle lens area
30 transition area
F far reference point and/or distance visual point
O upper edge
U lower edge
d reversal point

The invention claimed is:

1. A spectacle lens for a spectacle frame, comprising:
a first spectacle lens area; and
a second spectacle lens area,
wherein the first spectacle lens area is more strongly colored than the second spectacle lens area, and the spectacle lens is integrally phototropic at least in the second spectacle lens area,
wherein a transition area is arranged between the first spectacle lens area and the second spectacle lens area, along which transition area a coloring of the spectacle lens decreases from the first spectacle lens area to the second spectacle lens area, wherein the coloring changes approximately continuously along the transition area from the color grade of the first spectacle lens area to the color grade of the second spectacle lens area, and wherein a gradient coloration of the transition area is designed as a function of a refractive power curve in the spectacle lens.

2. The spectacle lens of claim 1, wherein a phototropic change in color of the spectacle lens is matched to a coloring of the first and/or second spectacle lens areas.

3. The spectacle lens of claim 1, wherein the first spectacle lens area in the visible light range exhibits an average transmission of at most 20% and/or the second spectacle lens area in the visible light range exhibits an average transmission of at least 60%.

4. The spectacle lens of claim 1,
wherein the first spectacle lens area is provided as an upper spectacle lens area comprising at least a distance reference point and/or a distance visual point of the spectacle lens, and wherein the first, upper spectacle lens area comprises the entire area of the spectacle lens that in wearing position is arranged above the distance reference point and/or the distance visual point.

5. The spectacle lens according to claim 1,
wherein the second spectacle lens area is provided as a lower spectacle lens area comprising at least a near reference point and/or a near visual point of the spectacle lens, and wherein the second, lower spectacle lens area comprises the entire area of the spectacle lens that in wearing position is arranged below the near reference point and/or the near visual point.

6. The spectacle lens of claim 1, wherein the coloring changes along the transition area approximately according to the formula:

$$f(y') = a1 + \frac{a2 - a1}{(1 + e^{c(y'-d)})},$$

wherein a1 corresponds to a maximum degree of absorption, a2 corresponds to a minimum degree of absorption, c corresponds to a factor for controlling the course of the function, d corresponds to the position of the reversal point, and y' corresponds either to the vertical spectacle lens coordinate y, or a spectacle lens coordinate rotated about an angle β to the vertical spectacle lens coordinate y.

7. The spectacle lens of claim 1,
wherein the coloring of the spectacle lens changes along the transition area along a distance of about 5 mm to about 20 mm, and/or wherein the transition area is arranged in a spectacle lens area that starts at an angle of rotation of at least 5° below the straight ahead gaze direction and ends at an angle of rotation of at most 25° below the straight ahead gaze direction, and/or wherein the spectacle lens exhibits the refractive power curve with an addition, and the transition area is arranged in a spectacle lens area of about 10% of the addition to about 50% of the addition in the refractive power curve, and/or wherein an upper edge of the transition area is arranged between about 5 mm and about 20 mm below the distance reference point and/or the distance visual point.

8. The spectacle lens according to claim 1, wherein the coloring of the spectacle lens areas is provided as a brown coloring.

9. The spectacle lens according to claim 1, further comprising:

an antireflection coating which has a residual reflection of less than 4% per spectacle lens side of the incident light in the wavelength range between 450 nm and 550 nm.

10. A method of manufacturing a spectacle lens for a spectacle frame, comprising:

coloring a first spectacle lens area more strongly than a second spectacle lens area; and providing at least the second spectacle lens area as an integral phototropic spectacle lens area, wherein a transition area is arranged between the first spectacle lens area and the second spectacle lens area, along which transition area a coloring of the spectacle lens decreases from the first spectacle lens area to the second spectacle lens area, wherein the coloring changes approximately continuously along the transition area from the color grade of the first spectacle lens area to the color grade of the second spectacle lens area, and wherein a gradient coloration of the transition area is designed as a function of a refractive power curve in the spectacle lens.

* * * * *